(12) United States Patent
Walters et al.

(10) Patent No.: US 7,097,187 B2
(45) Date of Patent: Aug. 29, 2006

(54) SUSPENSION SYSTEM FOR A MOTOR VEHICLE

(75) Inventors: Mark Walters, Royal Oak, MI (US); Stephen T Lim, Farmington Hills, MI (US); Kirt M Bennett, Linden, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 229 days.

(21) Appl. No.: 10/741,220

(22) Filed: Dec. 19, 2003

(65) Prior Publication Data

US 2004/0160030 A1    Aug. 19, 2004

Related U.S. Application Data

(60) Provisional application No. 60/435,373, filed on Dec. 20, 2002.

(51) Int. Cl.
 *B60G 21/04* (2006.01)
(52) U.S. Cl. .................. 280/124.128; 280/124.103
(58) Field of Classification Search ......... 280/124.103, 280/124.106, 124.128, 124.153, 124.179, 280/124.164, 93.51, 93.502, 93.506; 180/227
See application file for complete search history.

(56) References Cited

U.S. PATENT DOCUMENTS

| | | | | |
|---|---|---|---|---|
| 1,314,784 A | * | 9/1919 | Bock ................... 280/124.106 |
| 3,074,737 A | * | 1/1963 | Peras .................. 280/124.179 |
| 3,473,822 A | * | 10/1969 | Fitch ................... 280/124.101 |
| 4,003,443 A | * | 1/1977 | Boughers .................. 180/217 |
| 4,058,181 A | * | 11/1977 | Buell ..................... 180/227 |
| 4,065,144 A | * | 12/1977 | Winchell ................ 280/771 |
| 4,168,075 A | * | 9/1979 | Matschinsky ............ 280/5.52 |
| 4,265,329 A | * | 5/1981 | de Cortanze ................ 180/219 |
| 4,375,293 A | * | 3/1983 | Solbes ........................ 280/22.1 |
| 4,647,067 A | * | 3/1987 | Paquette et al. ............ 280/676 |
| 4,650,027 A | * | 3/1987 | de Cortanze ................ 180/227 |
| 4,702,338 A | * | 10/1987 | Trema ........................ 180/219 |
| 4,744,434 A | * | 5/1988 | Miyakoshi et al. ......... 180/219 |
| 4,756,379 A | | 7/1988 | Kawano et al. |
| 4,828,069 A | | 5/1989 | Hatsuyama |
| 4,834,408 A | * | 5/1989 | de Cortanze ......... 280/124.104 |
| 4,887,829 A | * | 12/1989 | Prince ....................... 280/282 |
| 4,890,857 A | | 1/1990 | De Cortanze |
| 4,917,209 A | * | 4/1990 | Horiike et al. .............. 180/219 |
| 4,974,863 A | * | 12/1990 | Patin ........................... 280/62 |
| 4,998,596 A | * | 3/1991 | Miksitz ..................... 180/213 |
| 5,107,950 A | * | 4/1992 | Horiike et al. .............. 180/219 |
| 5,495,913 A | * | 3/1996 | Salisbury .................... 180/227 |
| 5,611,555 A | | 3/1997 | Vidal |

(Continued)

*Primary Examiner*—Paul N. Dickson
*Assistant Examiner*—Barry Gooden, Jr.
(74) *Attorney, Agent, or Firm*—Thomas A. Jurecko

(57) ABSTRACT

An independent suspension system is provided for coupling a set of wheels to a vehicle body structure. The system includes independently pivotable swing arms, a shock absorber assembly, a joining arm and tie rods. The swing arms are attached to the vehicle body structure and to a respective wheel and the shock absorber assembly is mounted to the vehicle structure. The shock absorber assembly includes a biasing element and a linkage coupled to the joining arm and the biasing element. The suspension system further includes a tie rod connecting each swing arm to the joining arm. The joining arm is arranged to move in a lengthwise vehicle direction under control of the biasing element in response to road input to both wheels, and rotate about an attachment point without lengthwise movement to allow the tie rods to translate in opposite lengthwise direction in response to leaning of the vehicle.

6 Claims, 8 Drawing Sheets

U.S. PATENT DOCUMENTS

| | | | |
|---|---|---|---|
| 5,816,357 A * | 10/1998 | Camlin | 180/227 |
| 6,328,121 B1 | 12/2001 | Woodbury et al. | |
| 6,328,125 B1 * | 12/2001 | Van Den Brink et al. | 180/211 |
| 6,367,824 B1 * | 4/2002 | Hayashi | 280/62 |
| 6,675,926 B1 * | 1/2004 | Montague | 180/350 |
| 6,763,905 B1 * | 7/2004 | Cocco et al. | 180/210 |

* cited by examiner

SUSPENSION SYSTEM FOR A MOTOR VEHICLE

CROSS REFERENCE TO RELATED APPLICATION(S)

This application claims the benefit of U.S. Provisional Application No. 60/435,373 filed on Dec. 20, 2002.

FIELD OF THE INVENTION

The present invention relates generally to a suspension system for a motor vehicle and, more particularly, to an independent suspension system arrangement for a four wheel motorcycle type vehicle.

BACKGROUND OF THE INVENTION

Generally, motorcycles and all terrain vehicles, commonly referred to as ATV's, typically include two, three and four wheel configurations. In the three and four wheel configurations, adjacent wheels are typically spaced apart to span the width of the vehicle and also share a common axle. Spacing apart the wheels also provides the ability to mount suspension components to a common axle housing or to a wheel hub support structure located on an axle side of the wheel.

However, the aforementioned suspension configuration would not work well in a four wheel vehicle of narrow width where the wheels are spaced apart in a manner that does not allow enough space to mount suspension components between the wheels. For example, in a four wheel motorcycle arrangement, the motorcycle typically has a narrow width resulting in limited spaced between each set of spaced apart wheels. This limited space does not typically provide enough room to mount conventional suspension components, let alone an independent front and rear suspension system that would be required to accommodate a leaning condition of the four wheel motorcycle.

Thus, there is a need for a suspension system for a narrow width four wheel vehicle that overcomes the aforementioned and other disadvantages.

SUMMARY OF THE INVENTION

Accordingly, an improved independent suspension system is provided for coupling a set of wheels to a vehicle body structure. The suspension system includes independently pivotable swing arms attached at one end to the vehicle body structure and at the other end to a respective wheel, a joining arm arranged to be moveable in a lengthwise direction and rotateable about an attachment point and a shock absorber assembly mounted to the vehicle structure. The shock absorber assembly includes a biasing element and a linkage coupled to the joining arm and the biasing element. The suspension system further includes a tie rod connecting each respective swing arm to the joining arm. The joining arm is arranged to move in a lengthwise vehicle direction under control of the biasing element in response to road load input to both wheels, and rotate without lengthwise movement to allow the tie rods to translate in opposite lengthwise direction in response to leaning of the vehicle.

In accordance with another aspect of the present invention, the suspension system further includes independently pivotable steering arms and a steering mechanism. The steering arms are coupled to each respective wheel of a set of front wheels and the steering mechanism so as to pivot cooperatively with the swing arms.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
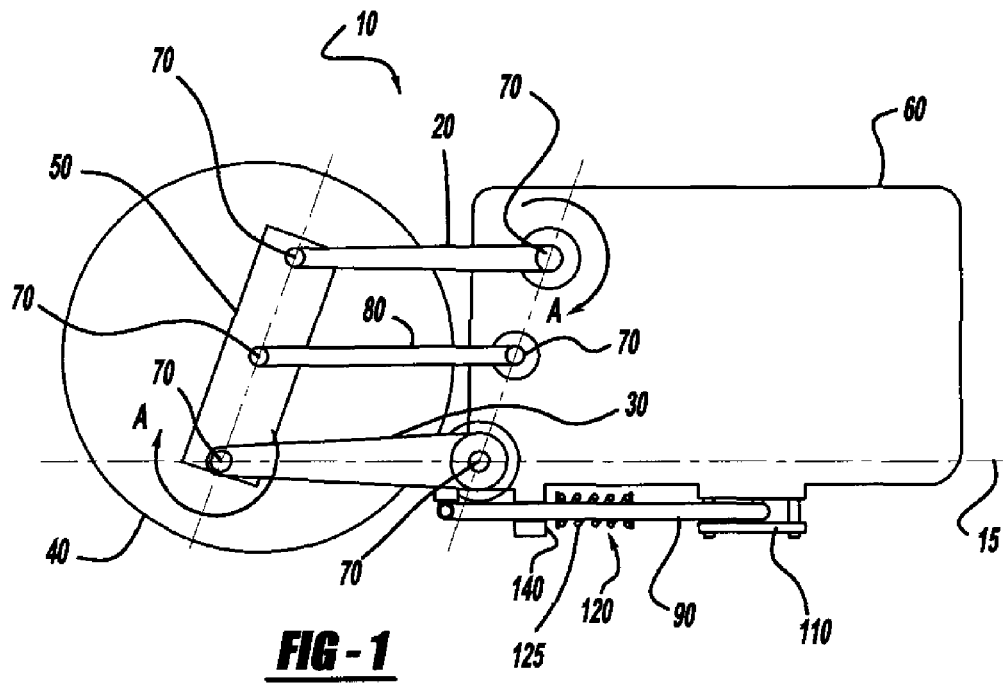
FIG. 1 illustrates a side view of a front suspension system in a static position in accordance with the present invention.
Figure 2:
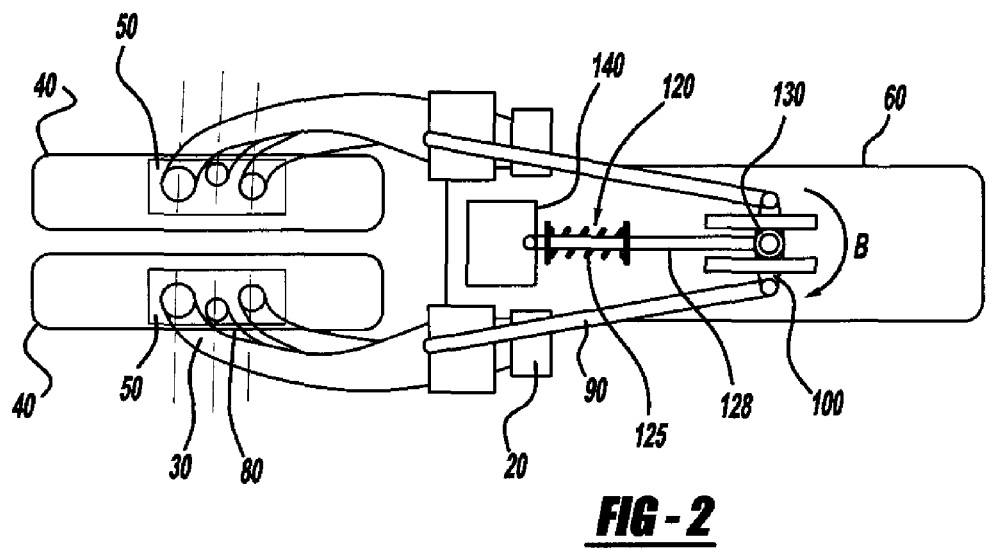
FIG. 2 illustrates a bottom view of the front suspension system shown in FIG. 1 in accordance with the present invention.

Referring now to the drawings, FIGS. 1 and 2 illustrate an exemplary embodiment of a front steering and suspension system 10 for a four wheel motorcycle in accordance with the present invention. The system includes a pair of upper swing arms 20 and lower swing arms 30 for pivotably coupling a pair of front wheels 40 via wheel hubs 50 to a vehicle body structure 60. Upper swing arms 20 and lower swing arms 30 are pivotably connected to wheel hub 50 at one end and to vehicle body structure 60 at the other end utilizing pivotable connections 70. Pivotable connection 70 allow rotation in both a direction shown by arrow A in FIG. 1 to provide for the swing arms to pivot in response to a road input and also in a direction shown by arrow B in FIG. 2 to provide for the swing arms to pivot in response to a steering input via steering arm 80 and an associated leaning condition of the vehicle.

Figure 4:
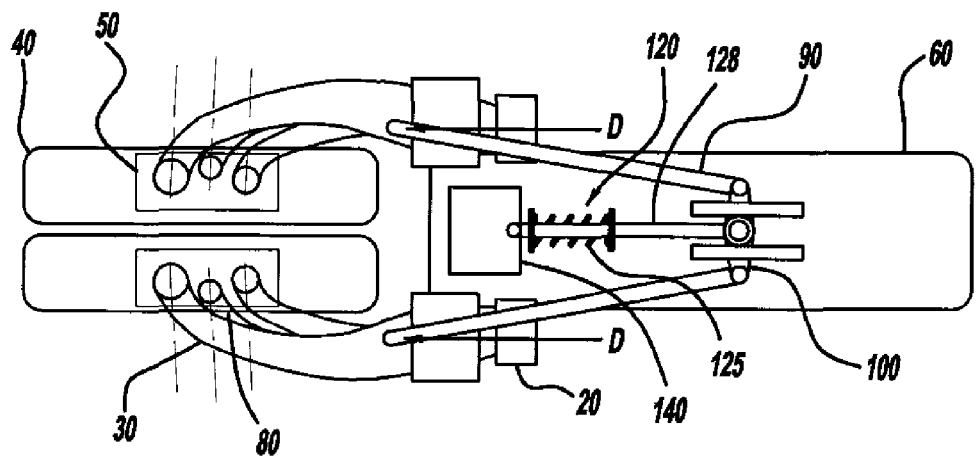
FIG. 4 illustrates a bottom view of the front suspension system operating mode illustrated in FIG. 3 in accordance with the present invention.

Suspension system 10 further includes a set of tie rods 90 pivotably connected at one end to respective lower swing arms 30 and at the other end to a joining arm 100. Joining arm 100 is also pivotably connected at a central pivotable connection 130 to one end of a shock absorber assembly 120. Shock absorber assembly 120 is then connected to vehicle body structure 60 at the other end 140. Shock absorber assembly 120 includes a biasing element 125, such as a spring, and a linkage 128 that connects biasing element 125 to central pivotable connection 130 as best shown in FIGS. 2, 4 and 5.

As best seen in FIG. 2, the adjacent front wheels 40 are positioned as a result of the narrow width of the motorcycle. This in turn does not allow for positioning of an independent suspension system between the two front wheels. Thus, the outer wheel mounted suspension system in accordance with the present invention allows for packaging of an independent suspension system on a four wheel motorcycle where the spacing of the front wheels does not provide for packaging a suspension system between the wheels.

Figure 3:
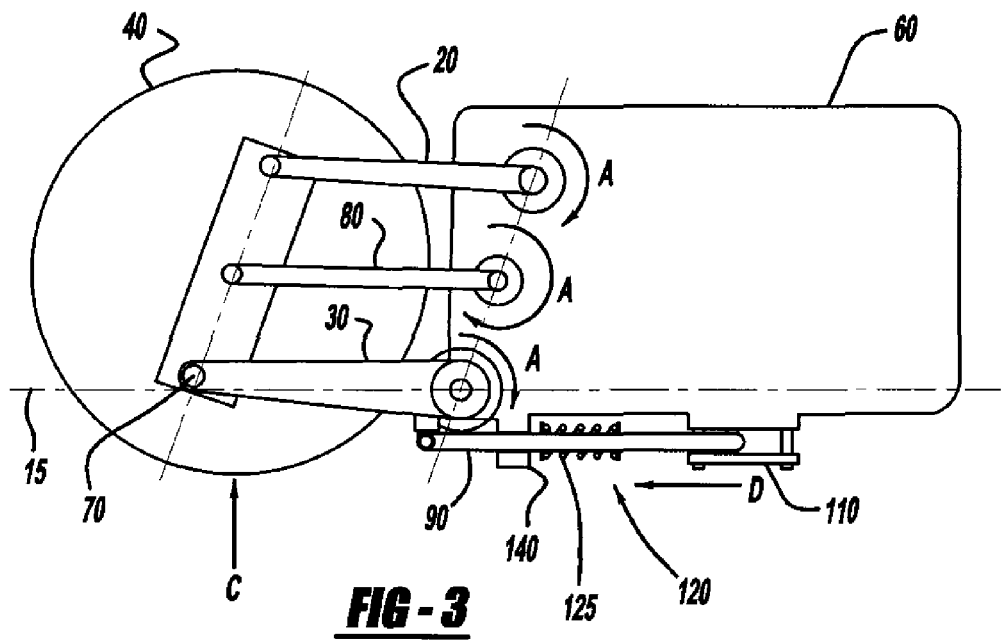
FIG. 3 illustrates a side view of an operating mode of the front suspension system responsive to input through both front tires in accordance with the present invention.

In operation and referring to FIGS. 3–6, independent front suspension system 10 is arranged to accommodate steering input as well as road input to the front tires. FIG. 3 illustrates an operating mode of the front suspension system in response to road input, such as a bump in the road, to both front tires in a direction shown by arrow C. In response to the road input, tires 40 move upward in the direction of arrow C by rotating about pivotable connections 70 of the upper and lower swing arms. The upward movement and rotation pulls tie rods 90 towards the front tires in a vehicle lengthwise direction as shown by arrow D. As tie rods 90 are pulled in direction D, this results in pulling joining arm 100 towards the front tires thereby compressing biasing element 125 of shock absorber assembly 120 and providing a dampening effect to the road input.

Figure 5:
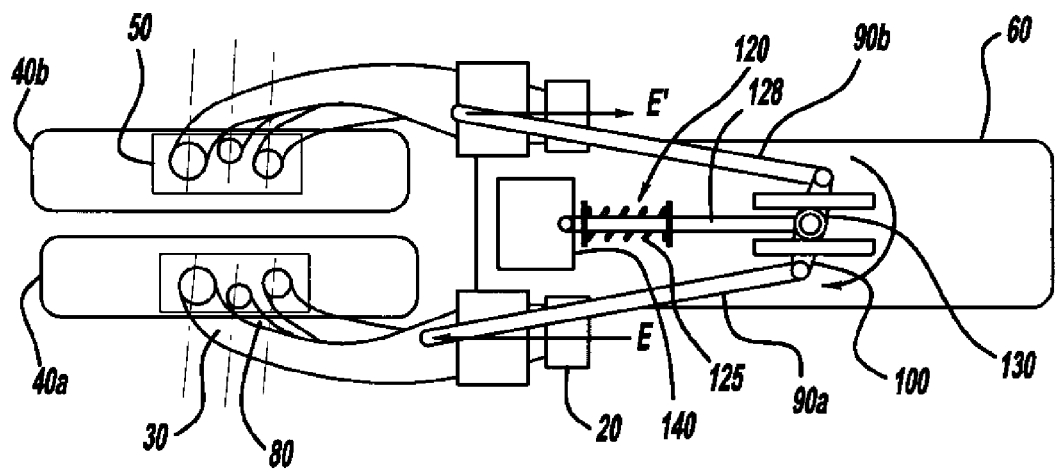
FIG. 5 illustrates a bottom view of a front suspension system operating mode responsive to a vehicle leaning condition in accordance with the present invention.
Figure 6:
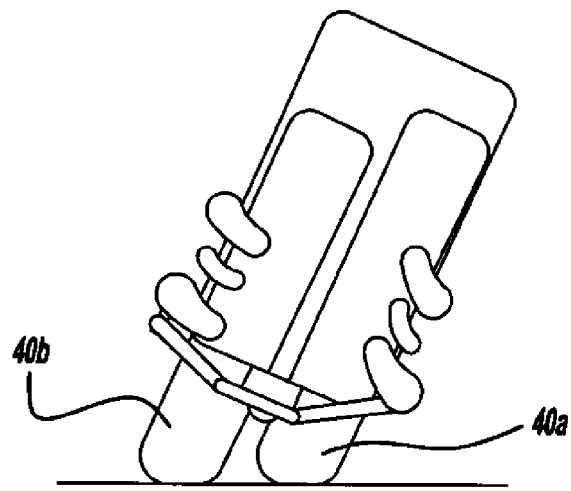
FIG. 6 illustrates a vehicle leaning condition and the corresponding movement of the vehicle front tires in accordance with the present invention.

As best seen in FIGS. 5 and 6, an operating mode of the front suspension system is shown in response to a leaning condition of the vehicle. Suspension system 10 is arranged to allow individual movement of the front tires in response to a leaning condition of the vehicle without compressing shock absorber assembly 120. For example, as shown in FIG. 6, when the four wheel motorcycle is in a leaning position, inside tire 40a raises upward in reference to a static position 15 while outside tire 40b lowers in reference to the static position 15. As tire 40a raises in response to the leaning position, this in turn draws tie rod 90a towards the front tires in a vehicle lengthwise direction as indicated by arrow E while rotating joining arm 100 around pivotable connection 130. At the same time, tire 40b lowers in response to the leaning position and this in turn pushes tie rod 90b in a vehicle lengthwise direction towards the rear of the vehicle as represented by arrow E' in FIG. 5. As tie rods 90a and 90b are connected to opposite ends of joining arm 130, the front tire movement of the four wheel motorcycle in response to a leaning condition allows for the tie rods to move in opposite directions and rotate joining arm 100 about pivot point 130 without compressing shock absorber assembly 120 during a leaning condition.

Figure 7:
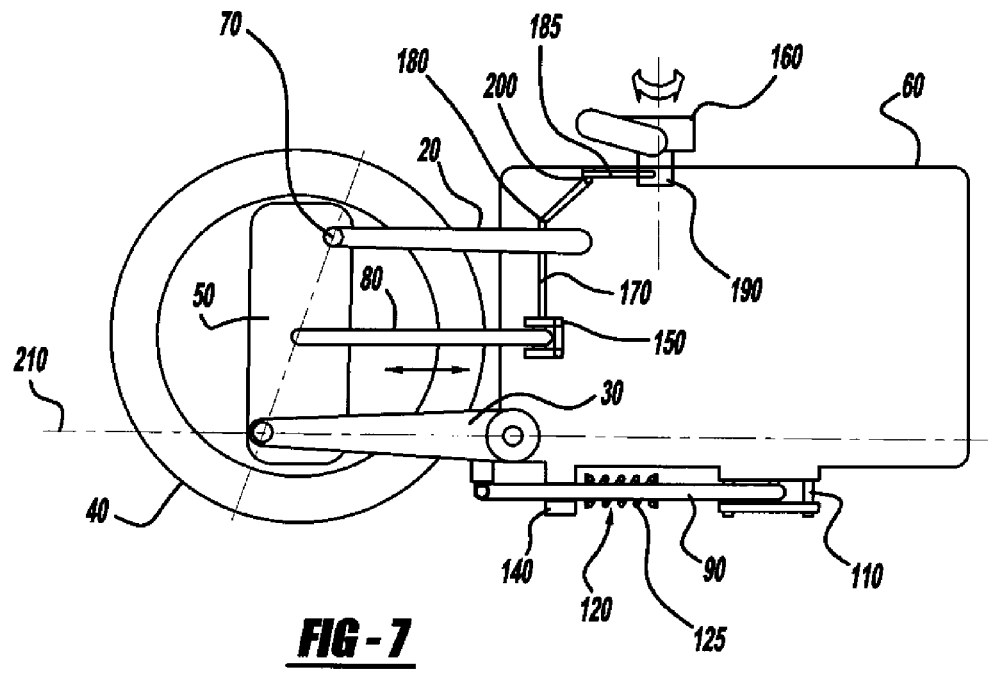
FIG. 7 illustrates the front suspension system shown in FIG. 1 further incorporating a steering assembly in accordance with the present invention.
Figure 8:
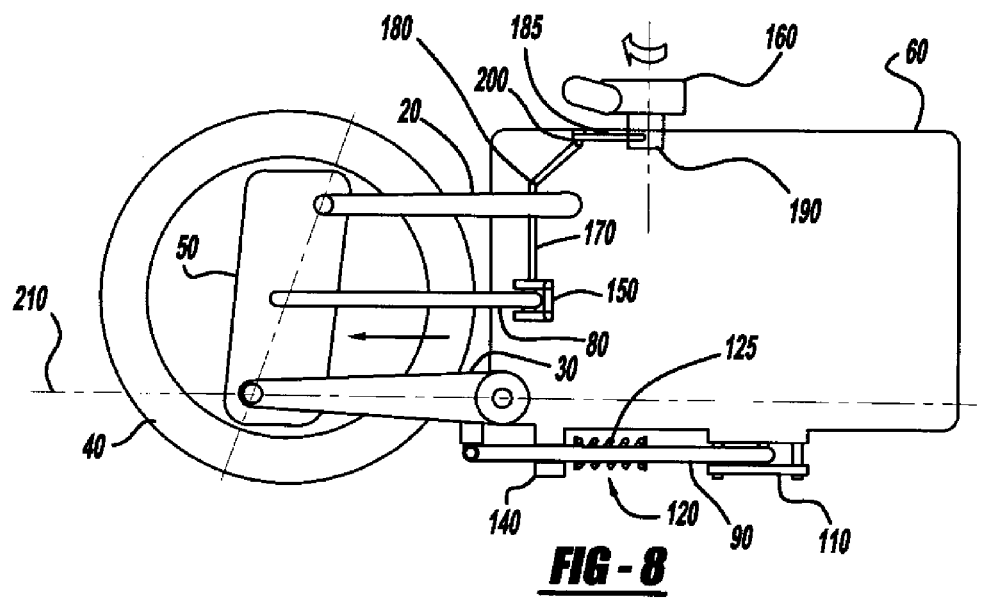
FIG. 8 illustrates the steering and suspension system of FIG. 7 in a position indicative of a right turn condition in accordance with the present invention.
Figure 9:
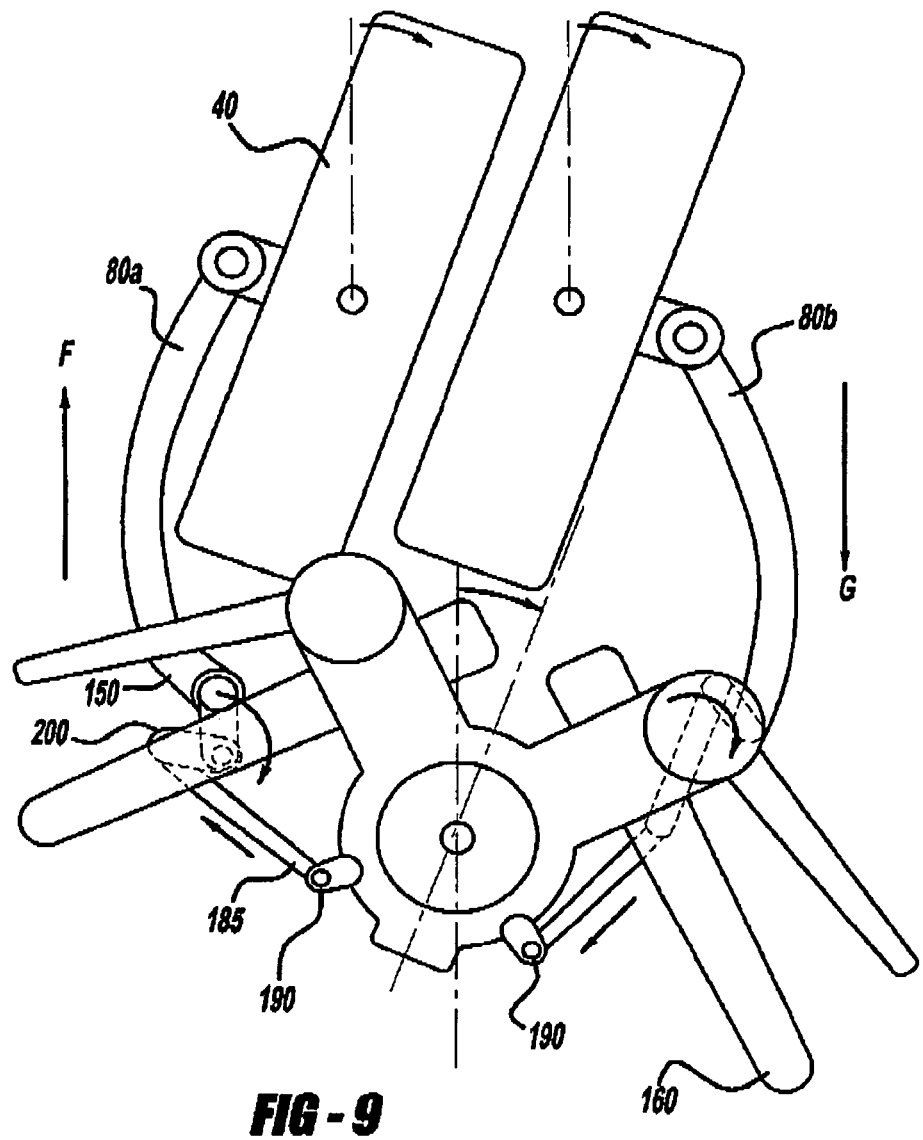
FIG. 9 illustrates a top view of the steering assembly positioned as indicated in FIG. 8 in accordance with the present invention.

Referring now to FIGS. 7 and 8, the steering system in accordance with the present invention is shown in detail. It should be appreciated that each respective steering arm 80 has the steering system described below providing a connection between each steering arm and handlebars 160. Steering arms 80 are pivotably connected at one end to wheel hubs 50 and at the other end to bell cranks 150. Steering arms 80 are connected to handlebars 160 through bell crank 150 which are connected to linkage member 170, universal joint 180, linkage member 185, and handlebar bell cranks 190 and 200. In operation, rotational motion generated by turning the handlebars 160 is translated through the bell cranks and linkage members to steering arms 80. As best seen in FIG. 9, an example of a right turn scenario is illustrated. Rotational motion of handlebars 160 is translated to the steering arms 80 as previously described resulting in steering arm 80a moving in a vehicle lengthwise forward direction as indicated by arrow F and steering arm 80b moving in a vehicle lengthwise rearward direction as indicated by arrow G.

It should be appreciated that simply turning the wheel without leaning the vehicle does not compress shock absorber assembly 120 because the front wheels have not moved up or down relative to static position 210. Moreover, it should be appreciated that turning motorcycle wheels are often combined with a leaning of the motorcycle during operation. In a right turn and lean condition, the front wheels would turn as previously described combined with the front wheels moving as shown in FIG. 6 resulting in translating tie rods 90 in opposite directions causing joining arm 100 to rotate about pivot point 130 without compressing shock absorber assembly 120.

Figure 10:
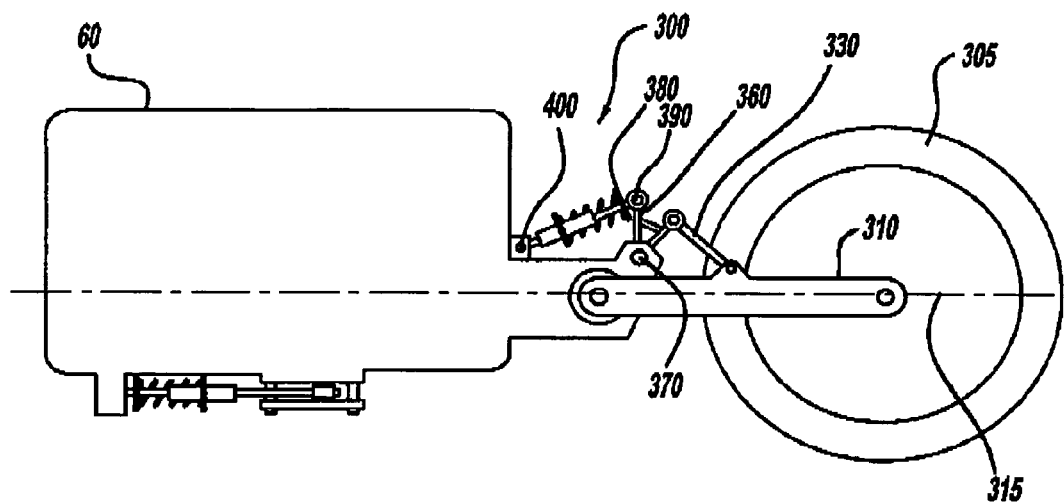
FIG. 10 illustrates a side view of a rear suspension system in a static position in accordance with the present invention.
Figure 11:
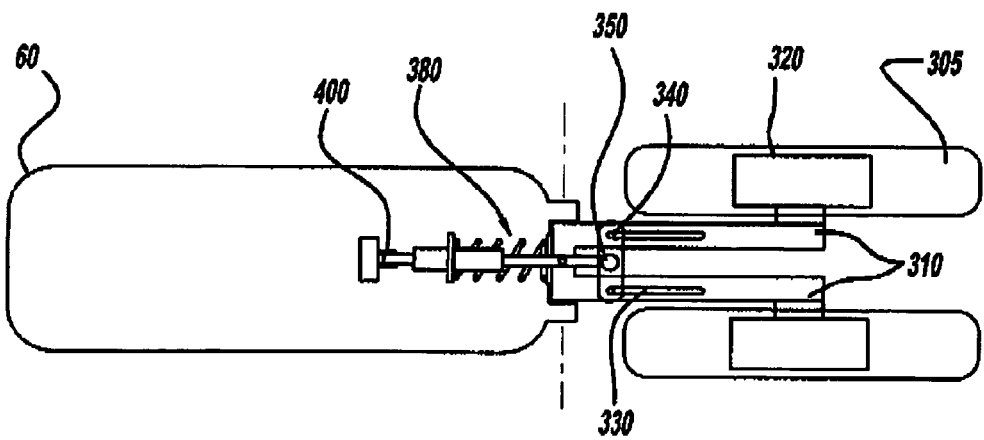
FIG. 11 illustrates a top view of the rear suspension system shown in FIG. 10 in accordance with the present invention.

Referring now to FIGS. 10 and 11, an independent rear suspension system 300 is shown in accordance with the present invention. Rear suspension system 300 includes a pair of rear swing arms 310 pivotably connected at one end to vehicle body structure 60 and at the other end to rear wheel hubs 320. Rear tie rods 330 are pivotably connected at one end to rear swing arms 310 and at the other end to opposite ends of rear joining arm 340. Joining arm 340 is rotateably connected to a multi-directional A-shaped bracket 360 at joining arm pivot point 350. Bracket 360 is also pivotable connected to vehicle body structure 60 at pivot point 370 and rear shock absorber assembly 380 at pivot point 390. Rear shock absorber 380 is then pivotably connected to vehicle body structure 60 at pivot point 400.

Referring now to FIGS. 12–15, a rear suspension operating mode is illustrated for both road input to the rear wheels as well as leaning of the vehicle. In operation, road input to rear wheels 305 in the direction of arrow H generally results in raising rear swing arms 310 above static position 315. Raising rear swing arms in turn pushes tie rods 330 in the direction of arrow J. As both tie rods move in the direction of arrow J, this results in rotating bracket 360 about pivot point 370 and thereby compressing shock absorber assembly 380 in the direction shown by arrow K.

Figure 12:
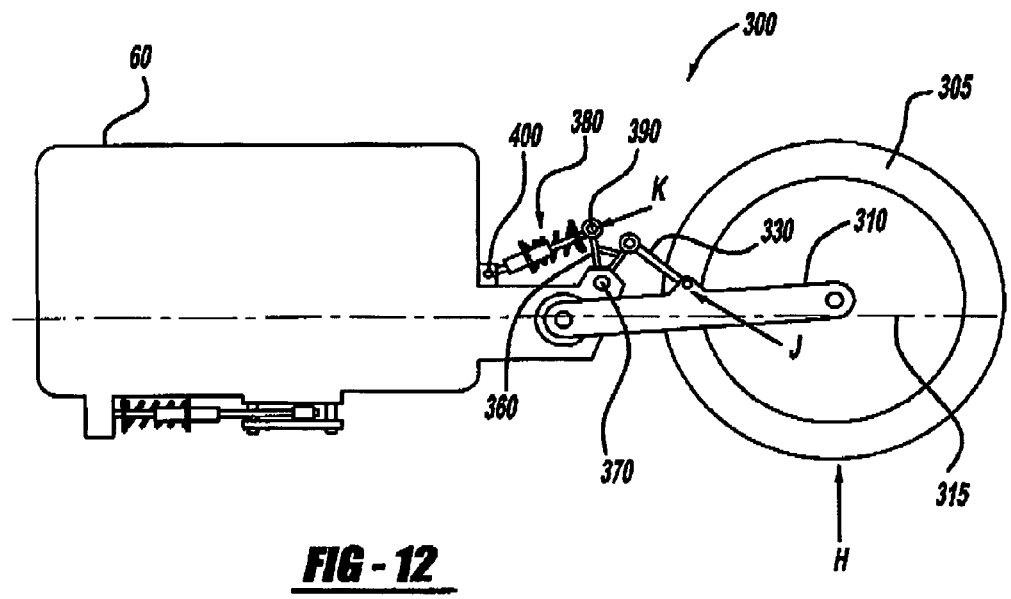
FIG. 12 illustrates a side view of an operating mode of the rear suspension responsive to input through both rear tires in accordance with the present invention.
Figure 13:
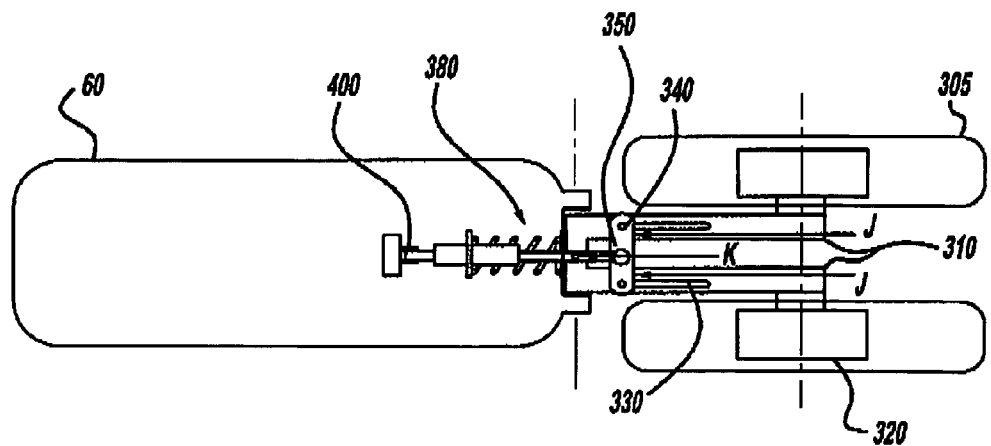
FIG. 13 illustrates a top view of the rear suspension operating mode illustrated in FIG. 12 in accordance with the present invention.
Figure 14:
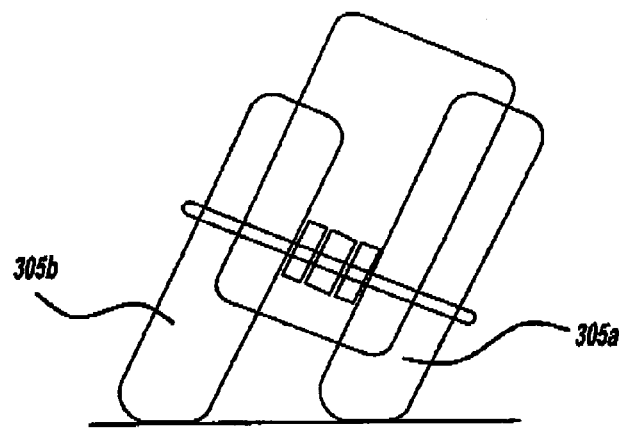
FIG. 14 illustrates a vehicle leaning condition and the corresponding movement of the vehicle rear tires in accordance with the present invention.
Figure 15:
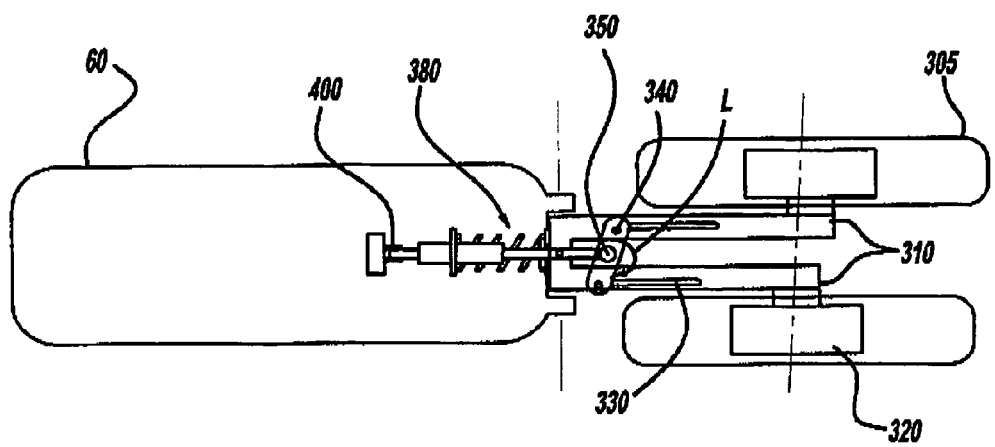
FIG. 15 illustrates a top view of a rear suspension system operating mode responsive to the vehicle leaning condition of FIG. 14 in accordance with the present invention.

As best seen in FIGS. 12, 14 and 15, operation of the rear suspension system is illustrated for a vehicle leaning condition. FIG. 14 illustrates positioning of the rear wheels in an analogous manner to the front wheels in a vehicle lean condition where inside rear tire 305a raises up from a static position 315 and outside rear tire 305b moves downward in relation to static position 315. As with the front suspension system, this results in tie rods 330 moving in opposite directions and thereby rotating joining arm 340 about pivot point 350 in the direction of arrow L while not rotating bracket 360 about pivot point 370 and thus not compressing shock absorber assembly 380.

Thus, the front and rear suspension systems in accordance with the present invention are arranged to accommodate upward and downward movement of each respective pair of front and rear wheels in response to a leaning condition while not compressing the respective shock absorber assemblies.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle suspension system for coupling a set of wheels to a vehicle body structure, the suspension system comprising:
   independently pivotable swing arms attached at one end to a vehicle body structure and at the other end to a respective wheel;
   a joining arm arranged to be slidably moveable in a vehicle lengthwise direction and rotateable about an attachment point;
   a shock absorber assembly mounted to a vehicle structure, the shock absorber assembly including a biasing element and a linkage coupled to the joining arm and the biasing element; and
   a tie rod connecting each respective swing arm to the joining arm, wherein the joining arm is arranged to move in a vehicle lengthwise direction under control of the biasing element in response to road input to both wheels, and rotate without lengthwise movement to allow the tie rods to translate in opposite lengthwise direction in response to leaning of the vehicle.

2. The suspension system of claim 1 wherein the swing arms comprise lower swing arms.

3. The suspension system of claim 1 wherein the swing arms comprise upper swing arms.

4. A vehicle suspension system for coupling a set of wheels to a vehicle body structure, the suspension system comprising:
   independently pivotable swing arms attached at one end to a vehicle body structure and at the other end to a respective wheel;
   a joining arm arranged to be moveable in a vehicle lengthwise direction and rotateable about an attachment point;
   a shock absorber assembly mounted to a vehicle structure, the shock absorber assembly including a biasing element and a linkage coupled to the joining arm and the biasing element;
   a tie rod connecting each respective swing arm to the joining arm, wherein the joining arm is arranged to move in a vehicle lengthwise direction under control of the biasing element in response to road input to both wheels, and rotate without lengthwise movement to allow the tie rods to translate in opposite lengthwise direction in response to leaning of the vehicle; and
   independently pivotable steering arms coupled to each respective wheel and a steering mechanism, the steering arms coupled to the steering mechanism so as to pivot cooperatively with the swing arms, and wherein the set of wheels comprise a pair of front wheels.

5. The suspension system of claim 4 wherein the swing arms comprise lower swing arms, the system further comprising independently pivotable upper swing arms coupled to each respective wheel and a vehicle body structure and arranged to pivot cooperatively with the lower swing arms.

6. A vehicle suspension system for coupling a set of wheels to a vehicle body structure, the suspension system comprising:
   independently pivotable swing arms attached at one end to a vehicle body structure and at the other end to a respective wheel;
   a joining arm arranged to be moveable in a vehicle lengthwise direction and rotateable about an attachment point;
   a shock absorber assembly mounted to a vehicle structure, the shock absorber assembly including a biasing element and a linkage coupled to the joining arm and the biasing element; and
   a tie rod connecting each respective swing arm to the joining arm, wherein the joining arm is arranged to move in a vehicle lengthwise direction under control of the biasing element in response to road input to both wheels, and rotate without lengthwise movement to allow the tie rods to translate in opposite lengthwise direction in response to leaning of the vehicle,
   wherein the set of wheels comprise a pair of front wheels and the swing arms comprise lower swing arms, the system further comprising independently pivotable upper swing arms coupled to each respective wheel and a vehicle body structure and arranged to pivot cooperatively with the lower swing arms.

* * * * *